United States Patent
Shao et al.

(10) Patent No.: US 8,373,356 B2
(45) Date of Patent: Feb. 12, 2013

(54) SYSTEM AND METHOD FOR A CONSTANT CURRENT SOURCE LED DRIVER

(75) Inventors: Jianwen Shao, Hoffman Estates, IL (US); John S. Lo Giudice, Palatine, IL (US); Thomas A. Stamm, Chicago, IL (US)

(73) Assignee: STMicroelectronics, Inc., Coppell, TX (US)

( * ) Notice: Subject to any disclaimer, the term of this patent is extended or adjusted under 35 U.S.C. 154(b) by 395 days.

(21) Appl. No.: 12/384,983

(22) Filed: Apr. 10, 2009

(65) Prior Publication Data

US 2010/0164404 A1 Jul. 1, 2010

Related U.S. Application Data (60) Provisional application No. 61/204,070, filed on Dec. 31, 2008.

(51) Int. Cl.
*H05B 37/00* (2006.01)
(52) U.S. Cl. .......... 315/291; 315/224; 315/307
(58) Field of Classification Search .......... 315/224, 315/291, 219, 307, 308; 323/284
See application file for complete search history.

(56) References Cited

U.S. PATENT DOCUMENTS

| | | | |
|---|---|---|---|
| 6,541,954 B1* | 4/2003 | Gluszek | 324/107 |
| 7,102,340 B1* | 9/2006 | Ferguson | 323/284 |
| 7,456,586 B2* | 11/2008 | Morejon | 315/247 |
| 7,569,996 B2* | 8/2009 | Holmes et al. | 315/291 |
| 2005/0259254 A1* | 11/2005 | Soller et al. | 356/328 |
| 2008/0033413 A1* | 2/2008 | Inochkin et al. | 606/11 |
| 2008/0088241 A1* | 4/2008 | Chen et al. | 315/88 |
| 2008/0129220 A1* | 6/2008 | Shteynberg et al. | 315/291 |
| 2008/0136350 A1* | 6/2008 | Tripathi et al. | 315/294 |
| 2008/0309255 A1* | 12/2008 | Myers et al. | 315/297 |
| 2009/0009097 A1* | 1/2009 | Li et al. | 315/209 R |
| 2009/0134817 A1* | 5/2009 | Jurngwirth et al. | 315/307 |
| 2009/0141534 A1* | 6/2009 | Chang et al. | 365/96 |
| 2009/0160422 A1* | 6/2009 | Isobe et al. | 323/349 |
| 2010/0026208 A1* | 2/2010 | Shteynberg et al. | 315/297 |
| 2010/0052568 A1* | 3/2010 | Cohen | 315/294 |
| 2010/0194304 A1* | 8/2010 | Mosebrook et al. | 315/246 |
| 2010/0207536 A1* | 8/2010 | Burdalski et al. | 315/224 |
| 2012/0081018 A1* | 4/2012 | Shteynberg et al. | 315/200 R |

* cited by examiner

*Primary Examiner* — David H Vu
(74) *Attorney, Agent, or Firm* — Munck Wilson Mandala, LLP (57) ABSTRACT

A system and method for providing a constant current source driver for a light emitting diode string. The converter includes a current sensor that derives feedback signal corresponding to a peak current through the light emitting diode string. The feedback signal is used by a controller to vary a duty cycle of the controller to regulate the average current. The controller is operable to regulate the average current as the number of light emitting diodes is increased and/or decreased.

20 Claims, 9 Drawing Sheets

SYSTEM AND METHOD FOR A CONSTANT CURRENT SOURCE LED DRIVER

CROSS-REFERENCE TO RELATED APPLICATION(S) AND CLAIM OF PRIORITY

The present application is related to U.S. Provisional Patent No. 61/204,070, filed Dec. 31, 2008, entitled "CONSTANT CURRENT SOURCE LED DRIVE". Provisional Patent No. 61/204,070 is assigned to the assignee of the present application and is hereby incorporated by reference into the present application as if fully set forth herein. The present application hereby claims priority under 35 U.S.C. §119(e) to U.S. Provisional Patent No. 61/204,070.

TECHNICAL FIELD OF THE INVENTION

The present application relates generally to light emitting diode drivers and, more specifically, to a constant current source for light emitting diodes.

BACKGROUND OF THE INVENTION

A Light Emitting Diode (LED) is an electronic light source. Like a normal diode, the LED consists of a chip of semiconducting material impregnated, or doped, with impurities to create a p-n junction. As in other diodes, current flows easily from the p-side, or anode, to the n-side, or cathode, but not in the reverse direction. Charge-carriers-electrons and holes-flow into the junction from electrodes with different voltages. When an electron meets a hole, it falls into a lower energy level, and releases energy in the form of a photon.

The current/voltage characteristics of an LED are similar to other diodes in that the current is dependent exponentially on the voltage. Therefore, a small change in voltage can lead to a large change in current. If the maximum voltage rating is exceeded by a small amount the current rating may be exceeded by a large amount, potentially damaging or destroying the LED.

SUMMARY OF THE INVENTION

A converter is provided. The converter includes a current sensor, a switch and a controller. The current sensor derives a feedback signal corresponding to a peak current through a light emitting diode string. The switch is coupled on a first end to the current sensor. The controller is coupled-on a first port to a second end of the switch and on a second port to the current sensor. The controller uses the feedback signal corresponding to the peak current to regulate the average current.

A light emitting diode system is provided. The light emitting diode system includes a light emitting diode string and a power converter. The power converter includes a current sensor, a switch and a controller. The current sensor derives a feedback signal corresponding to a peak current through the light emitting diode string. The switch is coupled on a first end to the current sensor. The controller is coupled on a first port to a second end of the switch and on a second port to the current sensor. The controller is configured to use the feedback signal corresponding to the peak current to regulate the average current.

A method for providing a constant current source is provided. The method includes sensing a peak current through a plurality of light emitting diodes. A feedback signal corresponding to the peak current is derived. The peak current is regulated based on the feedback signal. The average current is regulated by varying a duty cycle of the controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged LED system.

In order to prevent problems associated with exceeding the maximum voltage requirements, a typical solution is to use constant current power supplies, or driving the LED at a voltage much below the maximum rating. Since few household power sources (batteries, mains) are constant current sources, most LED fixtures must include a power converter.

Figure 1:
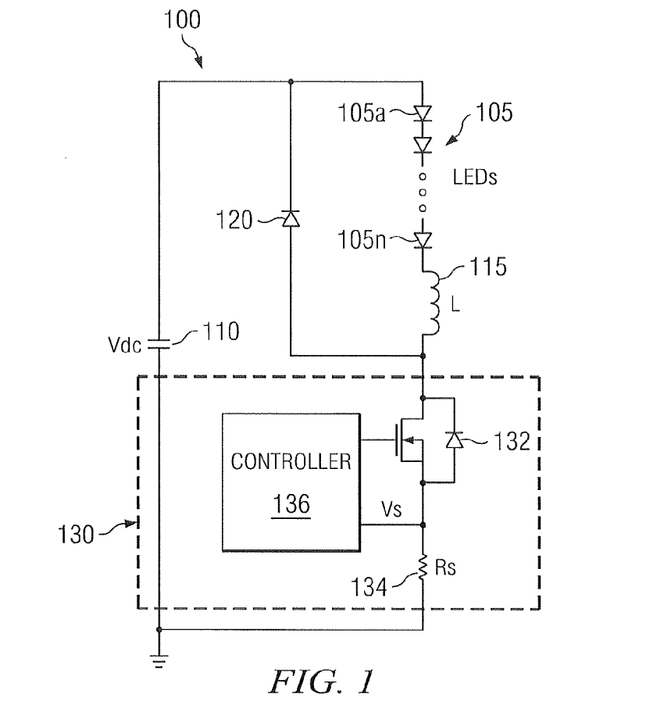
FIG. 1 illustrates an example LED system with a buck converter.

FIG. 1 illustrates an example LED system with a buck converter. The embodiment of the LED system with buck converter 100 shown in FIG. 1 is for illustration only. Other embodiments of the LED system with buck converter 100 could be used without departing from the scope of this disclosure.

The LED system includes a number of LEDs in an LED string 105. Although three LEDs are shown, embodiments including more than three LEDs and embodiments with less than three LEDs could be used without departing from the scope of this disclosure. The LED string 105 can be coupled in series, as shown in FIG. 1. However, embodiments wherein the LED string 105 is coupled in parallel could be used.

The LED string 105 is coupled to a voltage source 110 such that an anode of a first LED 105a of the LED string 105 is coupled to a positive terminal of the voltage source 110. The voltage source 110 can be a Direct Current (DC) voltage source.

The LED string 105 is coupled to an inductor 115 such that a cathode of a last LED 105n of the LED string 105 is coupled to one end of the inductor 115. The inductor 115 is coupled on a second end to the positive terminal of the voltage source 110 through a diode 120. The inductor 115 also is coupled on the second end to a buck converter 130.

The buck converter 130 includes a switch 132, a current sensing node 134 and a controller 136. The switch 132 can be a metal-oxide-semiconductor field-effect transistor (MOSFET). The current sensing node 134 is coupled to ground 140 through a resistor (Rs) 145.

The buck converter 130 or a "flyback" converter (described in further detail herein below with respect to FIGS. 3 through 5) can be used to drive one or more LEDs, e.g., the number of LEDs for the LED string 105. The controller 136 controls the peak current of the inductor 115. The peak current of the inductor 115 also can be the peak LED current. For fixed values of inductance (for inductor 115) and switching frequency, a desired average LED current is achieved by selecting an appropriate peak current only with an appropriate number of LEDs for the LED string 105.

If the peak LED current due to the voltage at the current sensing node 134 (Vs) is fixed, the average current through the LED string 105 may be calculated by Equations 1, 2 and 3:

$$Ipeak = \frac{Vs}{Rs}. \qquad \text{[Eqn. 1]}$$

$$Iave = Ipeak - \frac{1}{2} \times \frac{1-D}{L \times F} \times Vled. \qquad \text{[Eqn. 2]}$$

$$Iave = \frac{Vs}{Rs} - \frac{1}{2} \times \frac{1-D}{L \times F} \times Vled. \qquad \text{[Eqn. 3]}$$

In Equations 1, 2 and 3, Ipeak is the peak LED current; Iave is the average LED current; Rs is measured in Ohms (Ω); Vled is the voltage drop across the LED string 105; Vdc is the voltage of the voltage source 110; L is the inductance of the inductor 115; F is the switching frequency; and D is the duty cycle defined by Equation 4:

$$D = \frac{Vled}{Vdc}. \qquad \text{[Eqn. 4]}$$

Equation 2 illustrates that the average LED current in the LED system with buck converter 100 varies with Vled (e.g., the voltage drop across the LED string 105). Therefore, as the number of LEDs in the LED string 105 increases, the average current through the LED string 105 decreases.

Figure 2:
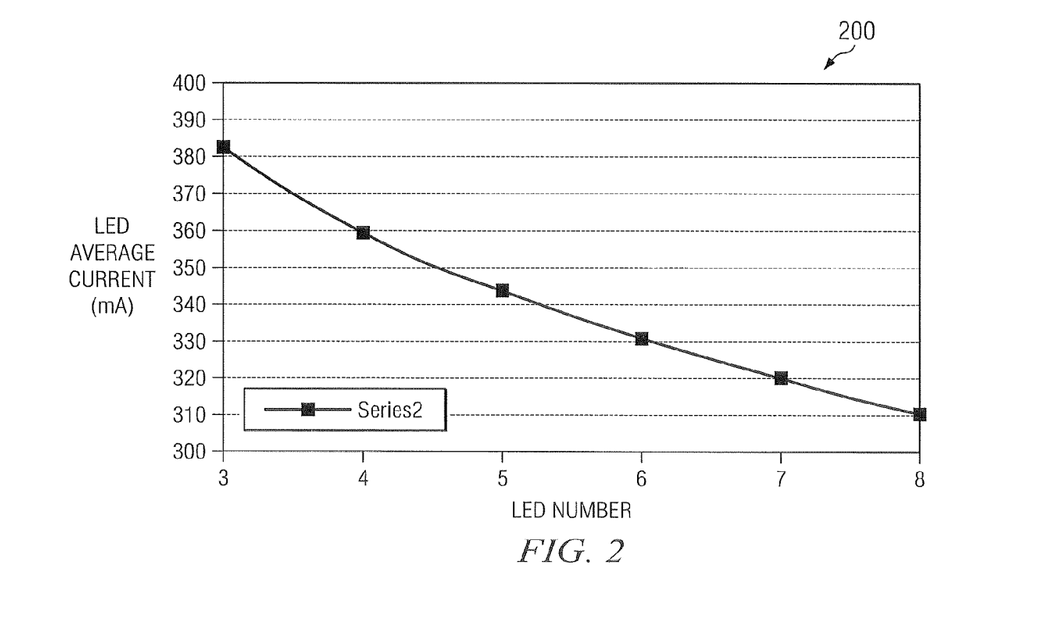
FIG. 2 illustrates an example graph of the average LED current against a number of LEDs in the LED string, with a same peak current value, according to embodiments of the present disclosure.

FIG. 2 illustrates an example graph of the average LED current against a number of LEDs in the LED string 105 according to embodiments of the present disclosure. The graph 200 shown in FIG. 2 is for illustration only. Other embodiments of the graph 200 could be used without departing from the scope of this disclosure. Further, in the graph 200, the peak current of the LEDs is the same.

As shown in FIG. 2, when the number of LEDs in the LED string 105 is increased, the average current decreases. For example, when the LED string 105 includes three LEDs, the average current is approximately 380 mA. However, when the LED string 105 includes seven LEDs, the average current is approximately 320 mA.

Figure 3:
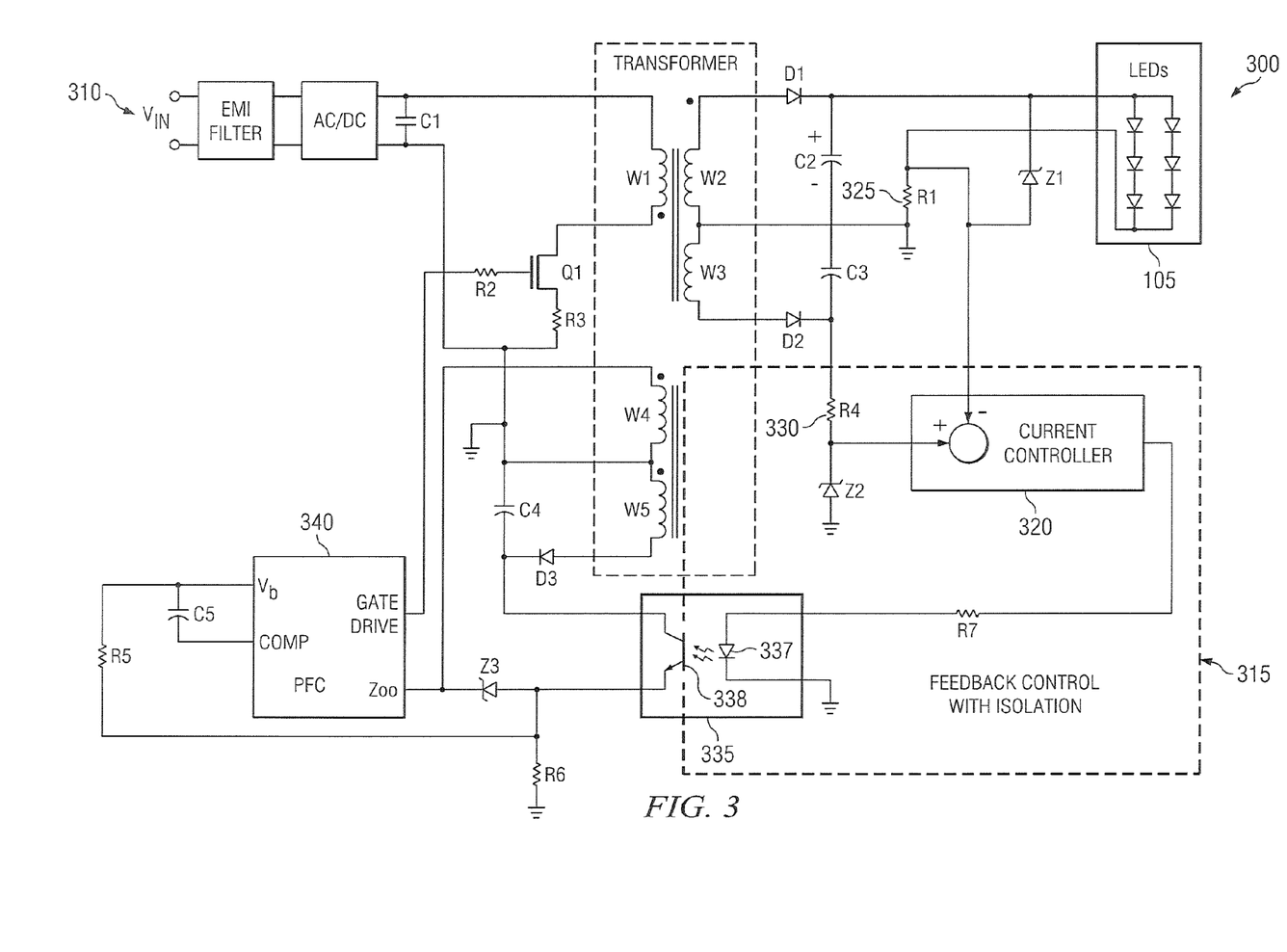
FIG. 3 illustrates an example LED system with a flyback converter with isolation according to embodiments of the present disclosure.

FIG. 3 illustrates an example LED system with a flyback converter with isolation according to embodiments of the present disclosure. The embodiment of the LED system 300 shown in FIG. 3 is for illustration only. Other embodiments of the LED system 300 could be used without departing from the scope of this disclosure.

Flyback converters used to drive LEDs are described in U.S. Pat. Nos. 6,577,512 and 6,304,464, the contents of which are hereby incorporated by reference in their entirety. The flyback converters described in U.S. Pat. No. 6,577,512 are provided with isolated feedback and compensation. However, not every application requires isolation.

The LED system 300 includes an LED string 105. The LED system 300 also includes terminals for a voltage source (Vin) 310. A feedback control with isolation 315 includes a current controller 320 that compares a current through a first resistor 325 against a reference or command current through a second resistor 330. An output signal from the current controller 320 is passed through an opto-isolator 335. The LED 337 is in optical communication with a phototransistor 338. The LED 337 and phototransistor 338 form an opto-isolator 335. When a high signal is applied to the input of the opto-isolator 335, the LED 337 emits a light signal. The phototransistor 338 detects the light and generates a corresponding electrical signal at an output. The electrical signal at the output is provided as a signal to an input port of the controller 340. Thereafter, the controller 340 uses the signal to drive a gate in order to vary the duty cycle of the controller 340.

Figure 4:
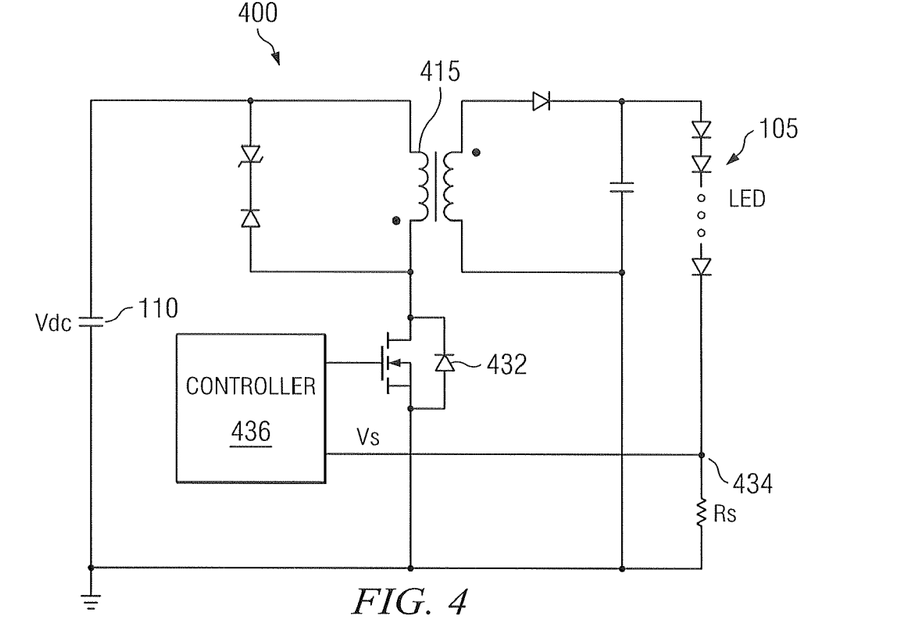
FIG. 4 illustrates an example of another LED system with a flyback converter according to embodiments of the present disclosure.

FIG. 4 illustrates an example of another simplified LED system with a flyback converter according to embodiments of the present disclosure. The LED system 400 shown in FIG. 4 is for illustration only. Other embodiments of the LED system 400 could be used without departing from the scope of this disclosure.

The LED system 400 includes LED string 105, voltage source 110, transformer 415, and a flyback converter (not specifically illustrated) including switch 432, current sensing node 434, and controller 436. Further, switch 432, current sensing node 434, and controller 436 may be comprise the same features and functionality as the switch 132, current sensing node 134 and controller 136 of FIG. 1. Here, the controller 436 also is configured to control a peak LED current. Again, as the number of LEDs is increased, the average current decreases.

Figure 5:
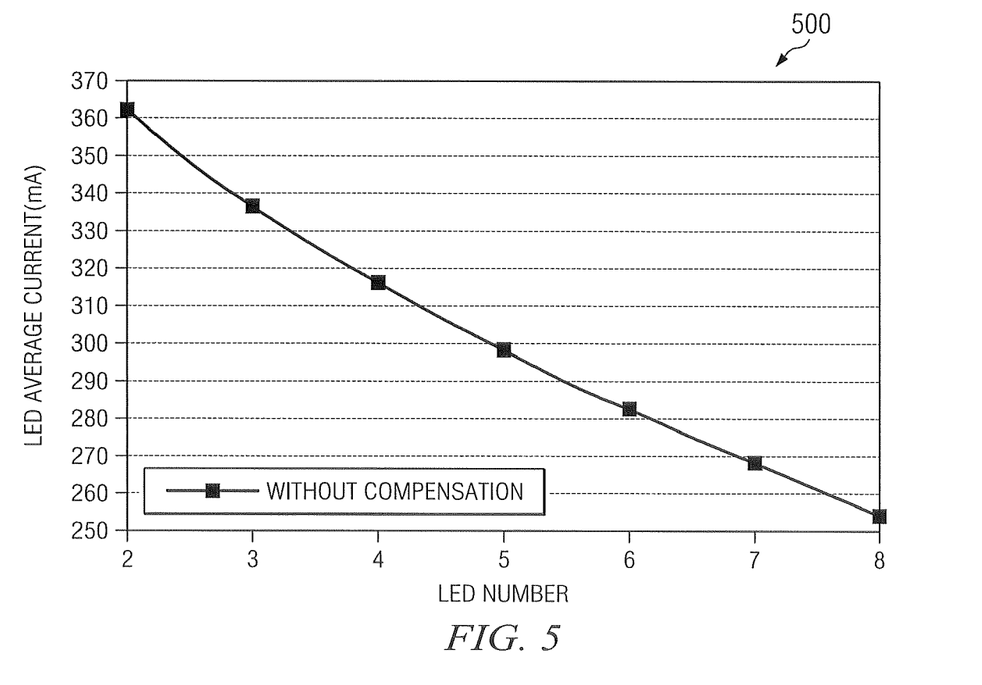
FIG. 5 illustrates another example graph of the average LED current against a number of LEDs in the LED string for a simplified LED system with a flyback converter according to embodiments of the present disclosure.

FIG. 5 illustrates another example graph of the average LED current against a number of LEDs in the LED string 105 for a simplified LED system with a flyback converter according to embodiments of the present disclosure. The graph 500 shown in FIG. 5 is for illustration only. Other embodiments of the graph 500 could be used without departing from the scope of this disclosure.

As shown in FIG. 5, when the number of LEDs in the LED string 105 is increased, the average current decreases. For example, when the LED string 105 includes two LEDs, the average current is approximately 360 mA. However, when the LED string 105 includes seven LEDs, the average current is approximately 270 mA.

Referring back to Equation 2, when D and L are fixed, either Ipeak or F may be varied to produce an average LED current that is less dependent upon the number of LEDs in the LED string 105. If the controller receives information about the number of LEDs, then the controller may adjust information about the value of the switching frequency.

Figure 6:
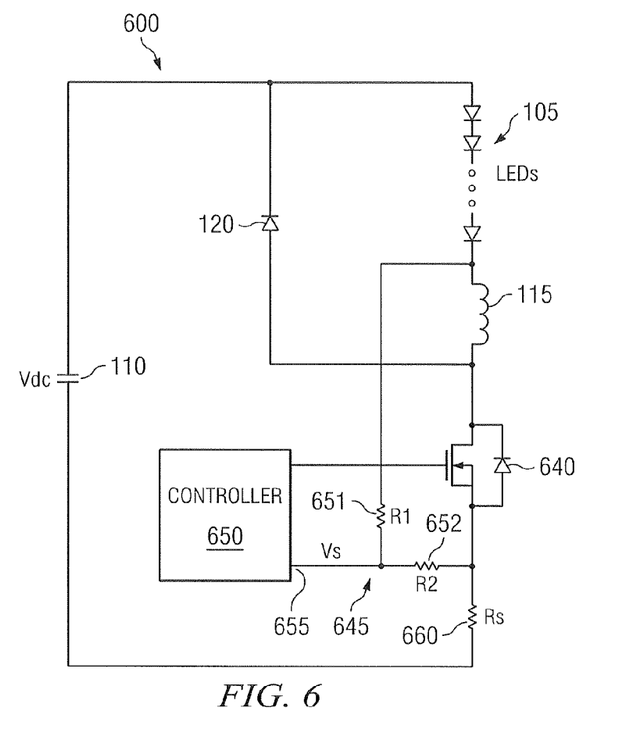
FIG. 6 illustrates an LED system with a constant current source buck converter according to embodiments of the present disclosure.

FIG. 6 illustrates an LED system with a constant current source buck converter according to embodiments of the present disclosure. The constant current source buck converter shown in FIG. 6 is for illustration only. Other embodiments of the constant current source buck converter could be used without departing from the scope of this disclosure.

The LED system 600 includes LED string 105, voltage source 110, inductor 115, diode 120 and the constant current source buck converter 630. The constant current source buck converter 630 includes a switch 640, a current sensor 645 and a controller 650.

The switch 640 is responsive to control signals received from the controller 650 to regulate the current of the LED string 105. The switch 640 can be any switch or array of switching devices capable of switching (e.g., powering on or off) the LED string 105. In some embodiments, the switch 640 is a MOSFET.

The current sensor 645 is configured to determine an average current through the LED string 105. The current sensor 645 is configured to derive a feedback signal corresponding to the average current through the LED string 105. In some embodiments, the feedback signal is one or both of a voltage drop across the LED string 105 (e.g., Vled) and the voltage of the voltage source 110 (e.g., Vdc). In some embodiments, the current sensor 645 is a voltage divider wherein a first resistor (R1) 651 is coupled between the LED string 105 and a sensing port 655 of the controller 650, and a second resistor (R2) 652 is coupled between the sensing port 655 and a terminal of the switch 640. R2 652 also is coupled to a sensing resistor 660 that further is coupled to the voltage source 110.

The controller 650 receives the feedback signal via the sensing port 655. The controller 650 uses the feedback signal to modulate the peak LED current through the LED string 105. For example, as the voltage drop across the LED string 105 increases because the number of LEDs increases (e.g., Vled increases), then the voltage across R1 651 decreases. Since the controller 650 operates to maintain the voltage (Vs) at the sensing port 654 to at a constant value, then, as Vled increases, the voltage across Rs 660 increases.

Thus, the average current through the LED string 105 the embodiment shown in FIG. 6 can be calculated by Equations 5, 6, 7, and 8

$$Vs = Ipeak \times Rs \times \frac{R1}{R1+R2} + (Vdc - Vled) \times \frac{R2}{R1+R2}. \quad [\text{Eqn. 5}]$$

$$Ipeak = \frac{1}{Rs} \times \left[ Vs \times \left(1 + \frac{R2}{R1}\right) - Vdc \times \frac{R2}{R1} + Vled \times \frac{R2}{R1} \right]. \quad [\text{Eqn. 6}]$$

$$Iave = \frac{1}{Rs} \times \left[ \begin{array}{c} Vs \times \left(1 + \frac{R2}{R1}\right) - Vdc \times \\ \frac{R2}{R1} + Vled \times \frac{R2}{R1} \end{array} \right] - \frac{1}{2} \times \frac{1-D}{L \times F} \times Vled. \quad [\text{Eqn. 7}]$$

$$Iave = \frac{Vs}{Rs} \times \left(1 + \frac{R2}{R1}\right) - \quad [\text{Eqn. 8}]$$

$$Vdc \times \frac{R2}{R1 \times Rs} + \left(\frac{R2}{R1 \times Rs} - \frac{1}{2} \times \frac{1-D}{L \times F}\right) \times Vled.$$

Values for R1 651 and R2 652 can be chosen in order to minimize the third term in Equation 8 (e.g., close to zero). Therefore, Vled will not have a substantial impact on the average current.

Figure 7:
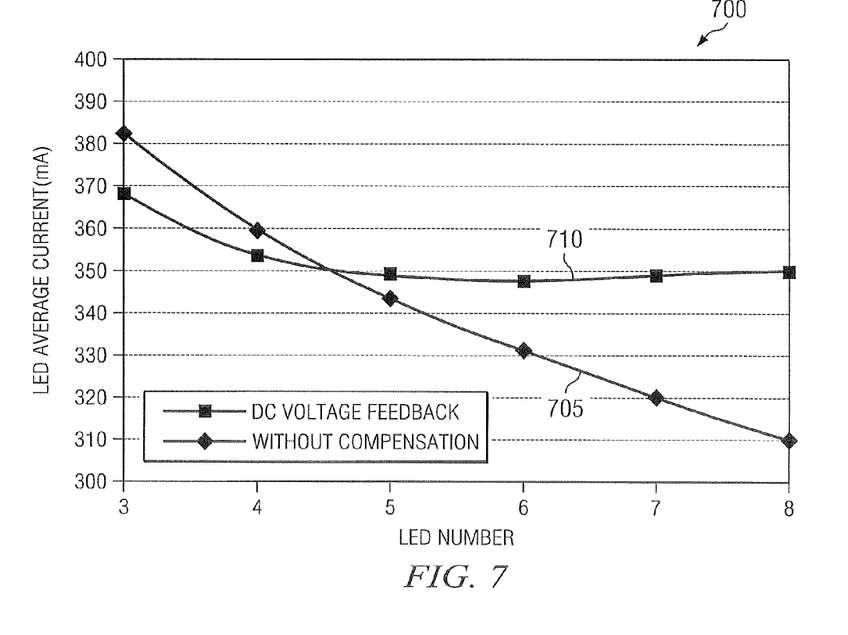
FIG. 7 illustrates an example graph of the average LED current against a number of LEDs in the LED string in an LED system with a constant current source buck converter according to embodiments of the present disclosure.

FIG. 7 illustrates an example graph of the average LED current against a number of LEDs in the LED string 105 in an LED system 600 with a constant current source buck converter according to embodiments of the present disclosure. The graph 700 shown in FIG. 7 is for illustration only. Other embodiments of the graph 700 could be used without departing from the scope of this disclosure.

For comparison, the graph 200 of FIG. 2 has been reproduced on FIG. 7. A first graph line 705 represents the circuit of FIG. 1 (e.g., illustrated on graph 200) and a second graph line 710 represents the performance of the LED system with the constant current source buck converter described with respect to FIG. 6. As shown in FIG. 7, as the number of LEDs in the LED string 105 is increased, the average current decreases moderately. For example, when the LED string 105 includes three LEDs, the average current is approximately 370 mA, as opposed to approximately 380 mA for the FIG. 1 embodiment. However, when the LED string 105 includes seven LEDs, the average current is approximately 350 mA, as opposed to approximately 320 mA for the FIG. 1 embodiment.

Referring back to Equation 8, the second term of Equation 8 illustrates that the average current varies with the voltage (Vdc) at the voltage source 110. Accordingly, when Vdc is fixed (e.g., a DC source), the average current will not be affected. However, if Vdc is not constant, the average current will vary with Vdc.

Figure 8:
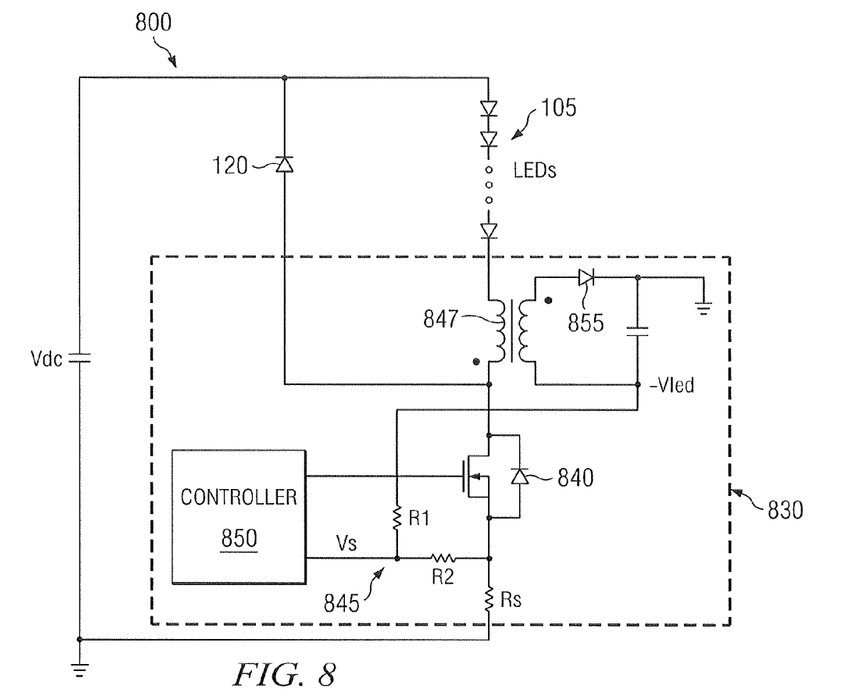
FIG. 8 illustrates another LED system with a constant current source LED driver according to embodiments of the present disclosure.

FIG. 8 illustrates another LED system with a constant current source LED driver according to embodiments of the present disclosure. The embodiment of the LED system 800 shown in FIG. 8 is for illustration only and other embodiments could be used without departing from the scope of this disclosure.

The LED system 800 includes an LED string 105, a voltage source 110, a diode 120 and a buck converter 830. The buck converter 830 includes a controller 850, a switch 840, and a current sensor. The current sensor comprises a voltage divider 845 and a transformer 847.

The buck converter 830 modulates the peak current through the LED string 105 in response to the feedback signal. The feedback signal can be Vled as derived through transformer 847 the voltage divider 845. For example, when the switch 840 is 'on', the current flows through the LED string 105 and through the transformer 847. However, when the switch 840 is 'off', the LED string 105 current will freewheel through the diode 855. The secondary side of the transformer 847 will see the LED voltage (Vled). Therefore, based on turns ratio in the transformer 847 and the properties of the voltage divider 845, the controller 850 receives a feedback signal associated with Vled that further corresponds to the average current.

Thus, the average current through the LED string 105 of the embodiment shown in FIG. 8 may be calculated by Equations 9, 10 and 11:

$$Vs = Ipeak \times Rs \times \frac{R1}{R1+R2} + Vled \times \frac{R2}{R1+R2}. \quad [\text{Eqn. 9}]$$

$$Ipeak = \frac{1}{Rs} \times \left[ Vs \times \left(1 + \frac{R2}{R1}\right) + Vled \times \frac{R2}{R1} \right]. \quad [\text{Eqn. 10}]$$

$$Iave = \frac{1}{Rs} \times \left[ Vs \times \left(1 + \frac{R2}{R1}\right) + \left(\frac{R2}{R1 \times Rs} - \frac{1}{2} \times \frac{1-D}{L \times F}\right) \times Vled \right]. \quad [\text{Eqn. 11}]$$

R1 and R2 are selected such that $$\frac{R2}{R1 \times Rs} - \frac{1}{2} \times \frac{1-D}{L \times F}$$

is minimized. Therefore, the average LED current is less reactive to Vled.

Figure 9:
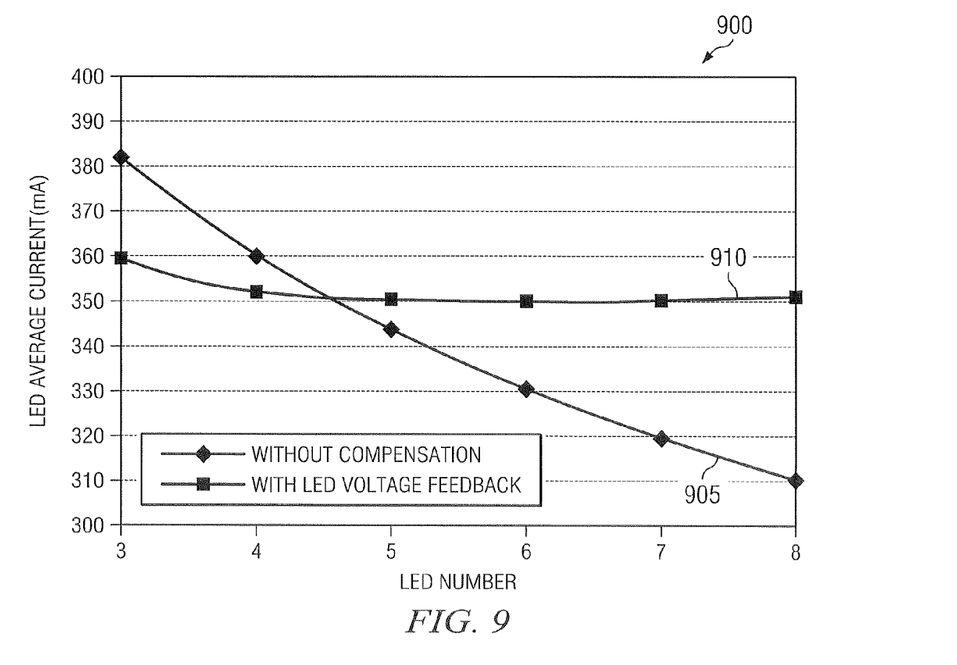
FIG. 9 illustrates an example graph of the average LED current against a number of LEDs in the LED string in an LED system with a constant current source LED driver according to embodiments of the present disclosure.

FIG. 9 illustrates an example graph of the average LED current against a number of LEDs in the LED string 105 in an LED system 800 with a constant current source LED driver according to embodiments of the present disclosure. The graph 900 shown in FIG. 9 is for illustration only. Other embodiments of the graph 900 could be used without departing from the scope of this disclosure.

For comparison, the graph 200 of FIG. 2 has been reproduced on FIG. 9. A first graph line 905 represents the circuit of FIG. 1 (e.g., illustrated on graph 200) and a second graph line 910 represents the performance of the LED system 800 with the constant current source buck converter described with respect to FIG. 8. As shown in FIG. 9, as the number of LEDs in the LED string 105 is increased, the average current decreases moderately. For example, when the LED string 105 includes three LEDs, the average current is approximately 360 mA, as opposed to approximately 380 mA for the FIG. 1 embodiment. However, when the LED string 105 includes seven LEDs, the average current is approximately 350 mA, as opposed to approximately 320 mA for the FIG. 1 embodiment.

Figure 10:
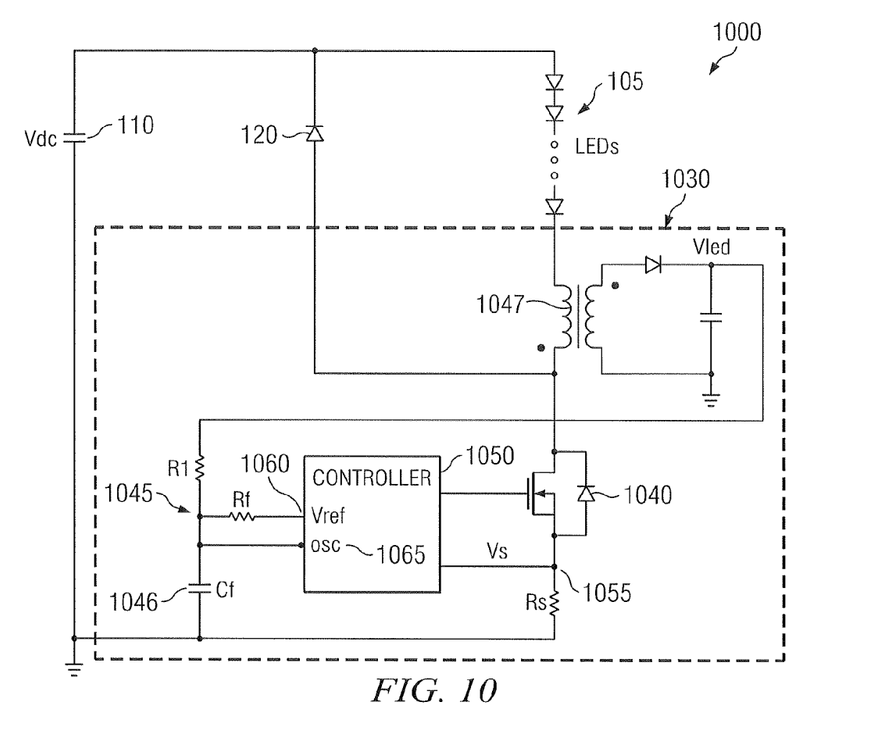
FIG. 10 illustrates another LED system with a constant current source LED driver according to embodiments of the present disclosure.

FIG. 10 illustrates another LED system with a constant current source LED driver according to embodiments of the present disclosure. The embodiment of the LED system 1000 shown in FIG. 10 is for illustration only and other embodiments could be used without departing from the scope of this disclosure.

Figure 14:
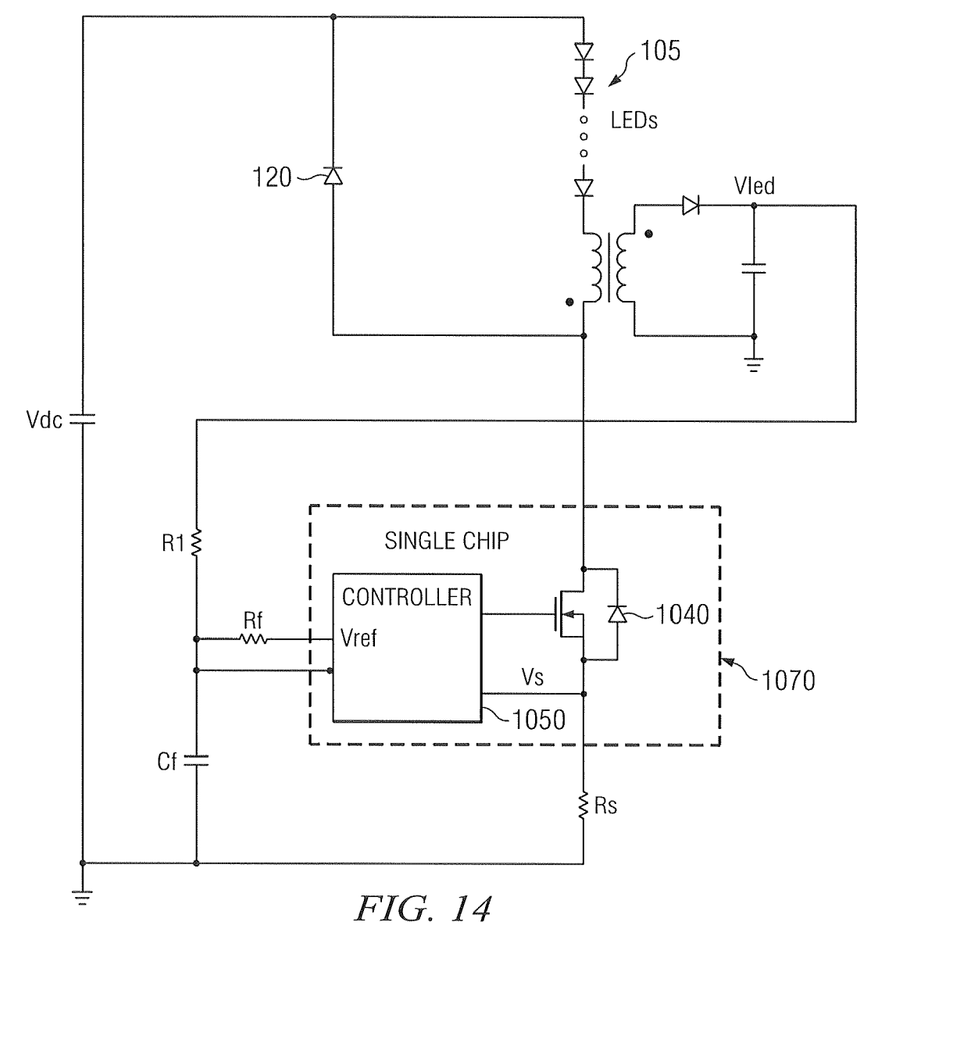
FIGS. 14 through 16 illustrate additional and alternative embodiments of the LED system with a constant current source LED driver according to embodiments of the present disclosure.

The LED system 1000 includes an LED string 105, a voltage source 110, a diode 120 and a buck converter 1030. The buck converter 1030 includes a controller 1050, a switch 1040, and a current sensor. The current sensor comprises a voltage divider 1045, a capacitor 1046 and a transformer 1047. The voltage divider 1045 includes a first resistor R1 1047 and a second resistor Rf 1048. In some embodiments, the controller 1050 and switch 1040 are included in a single chip 1070 as illustrated in FIG. 14.

Here, the current sensor derives the feedback signal based on Vled. The controller 1050 includes a sensing port 1055 and a reference port 1060. Further, the controller 1050 is configured to regulate the average current by modulating the switching frequency. Here, the average current is calculated based on Equation 12:

$$Iave = \frac{Vs}{Rs} - \frac{1}{2} \times \frac{1-D}{L} \times \frac{Vled}{F}. \quad [\text{Eqn. 12}]$$

Equation 12 illustrates that if $$\frac{Vled}{F}$$

is constant, then the average current is constant.

The buck converter 1030 modulates the switching frequency of the circuit according to the feedback signal. The values for Rf 1048 and Cf 1046 are selected to set the switching frequency of the controller 1030 according to the value of Vled. The higher the value of Vled, the higher the frequency of an oscillator 1065 within the controller 1030. One example of controller 1050 is a UC3842.

Figure 11:
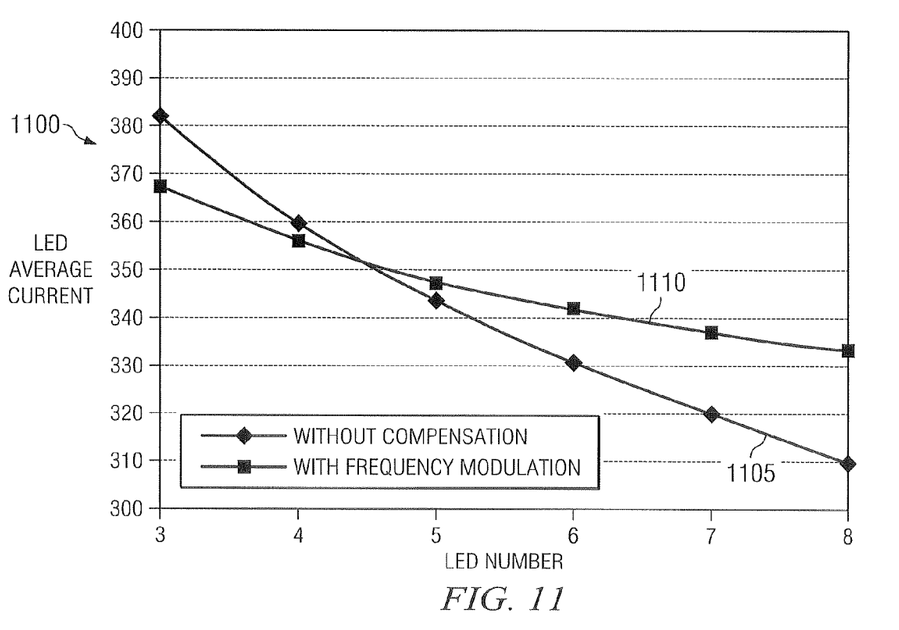
FIG. 11 illustrates an example graph of the average LED current against a number of LEDs in the LED string in an LED system with a constant current source LED driver according to embodiments of the present disclosure.

FIG. 11 illustrates an example graph of the average LED current against a number of LEDs in the LED string 105 in an LED system 1000 with a constant current source buck converter according to embodiments of the present disclosure. The graph 1100 shown in FIG. 11 is for illustration only. Other embodiments of the graph 1100 could be used without departing from the scope of this disclosure.

For comparison, the graph 200 of FIG. 2 has been reproduced on FIG. 11. A first graph line 1105 represents the circuit of FIG. 1 (e.g., illustrated on graph 200) and a second graph line 1110 represents the performance of the LED system 1000 with the constant current source buck converter described with respect to FIG. 10. As shown in FIG. 11, as the number of LEDs in the LED string 105 is increased, the average current decreases moderately. For example, when the LED string 105 includes three LEDs, the average current is approximately 368 mA, as opposed to approximately 380 mA for the FIG. 1 embodiment. However, when the LED string 105 includes seven LEDs, the average current is approximately 338 mA, as opposed to approximately 320 mA for the FIG. 1 embodiment.

Figure 12:
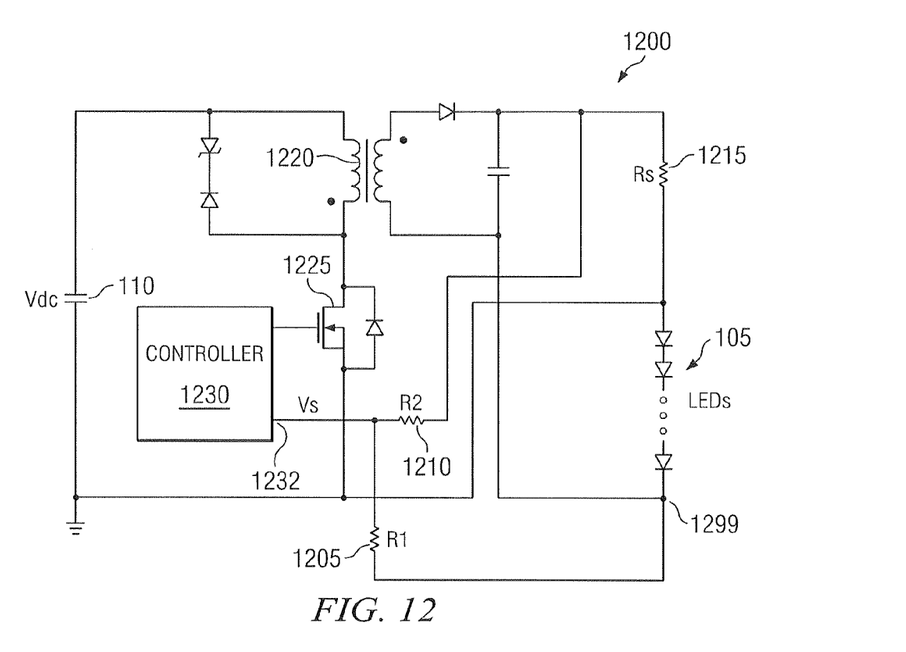
FIG. 12 illustrates an LED system with a constant current source flyback converter according to embodiments of the present disclosure.

FIG. 12 illustrates an LED system with a constant current source flyback converter according to embodiments of the present disclosure. The embodiment of the LED system 1200 shown in FIG. 12 is for illustration only. Other embodiments of the LED system 1200 could be used without departing from the scope of this disclosure.

The LED system with a constant current source flyback converter 1200 includes an LED string 105; voltage source 110; a number of resistors, R1 1205, R2 1210 and Rs 1215; a transformer 1220; a switch 1225 and a controller 1230.

R1 1205 is coupled between the sensing port 1232 of the controller 1230 and the cathode of the last LED in the LED string 105. R2 1210 and is coupled between the sensing port 1232 and Rs 1215. Rs 1215 is coupled between one terminal of the secondary coils of transformer 1220 and the anode of the first LED in the LED string 105. Further, a node connecting Rs 1215 and the anode of the first LED in the LED string 105 is coupled to ground 1299. The other terminal of the secondary coils of transformer 1220 is coupled to the cathode of the last LED in the LED string 105. The switch 1225 is coupled between the primary coils of transformer 1220 and ground 1299. The switch 1225 also is operatively coupled to the controller 1230 via a command/control line.

In the embodiment illustrated in FIG. 12, as the number of LEDs in the LED string increases, the voltage across R1 1205 decreases. Since the controller 1230 regulates Vs to be constant, the voltage across R2 1210 increases. Therefore, the controller 1230 increases the duty cycle to maintain the voltage Vs.

Figure 13:
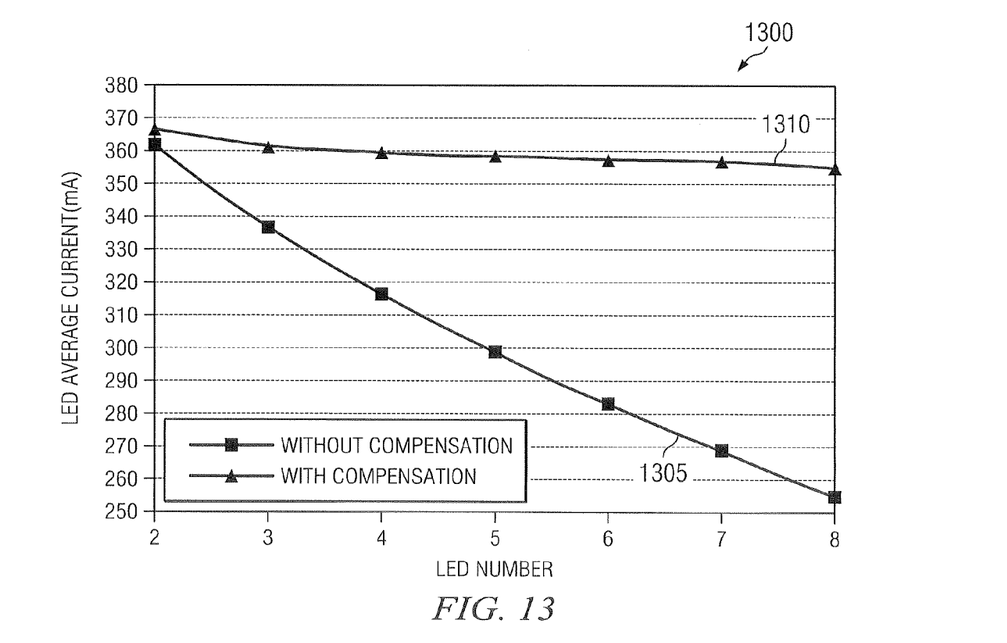
FIG. 13 illustrates an example graph of the average LED current against a number of LEDs in the LED string in an LED system with a constant current source flyback converter according to embodiments of the present disclosure.

FIG. 13 illustrates an example graph of the average LED current against a number of LEDs in the LED string 105 in an LED system 1200 with a constant current source flyback converter according to embodiments of the present disclosure. The graph 1300 shown in FIG. 13 is for illustration only. Other embodiments of the graph 1300 could be used without departing from the scope of this disclosure.

For comparison, the graph 500 of FIG. 5 has been reproduced on FIG. 13. A first graph line 1305 represents the circuit of FIG. 4 (e.g., illustrated on graph 500) and a second graph line 1310 represents the performance of the LED system 1200 with the constant current source flyback converter described with respect to FIG. 12. As shown in FIG. 13, as the number of LEDs in the LED string 105 is increased, the average current decreases moderately. For example, when the LED string 105 includes two LEDs, the average current is approximately 368 mA, as opposed to approximately 360 mA for the FIG. 1 embodiment. However, when the LED string 105 includes seven LEDs, the average current is approximately 355 mA, as opposed to approximately 270 mA for the FIG. 4 embodiment.

Figure 15:
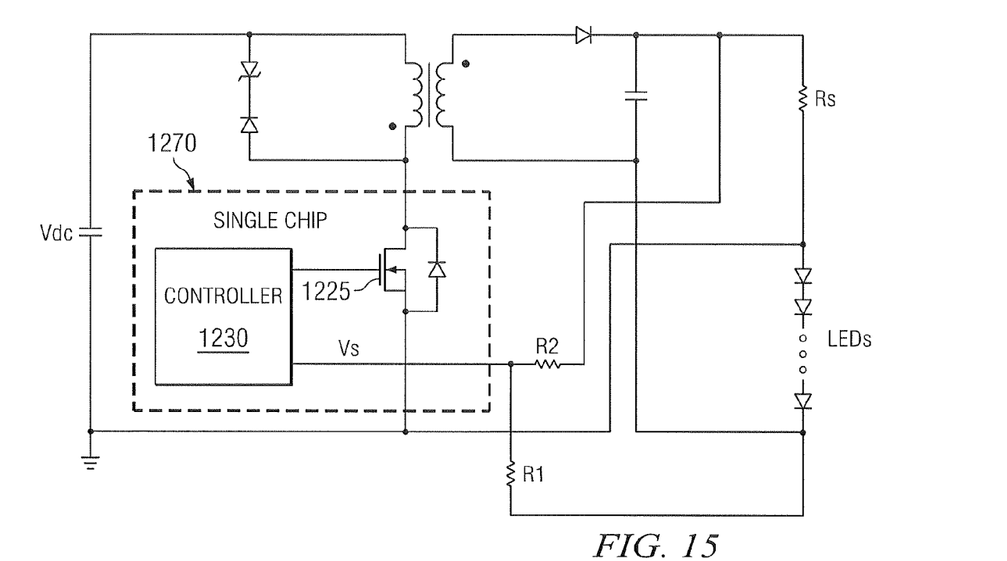
Figure 16:
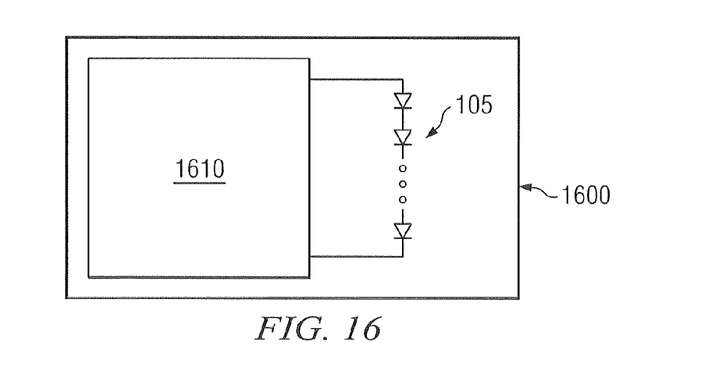

FIGS. 14 through 16 illustrate additional and alternative embodiments of the LED system with a constant current source LED driver according to embodiments of the present disclosure. The embodiments of the LED systems shown in FIGS. 14 through 16 are for illustration only.

In FIG. 14, the controller 1050 and switch 1040 are included in a single chip 1070. In FIG. 15, the controller the controller 1050 and switch 1040 are included in a single chip 1270. In FIG. 16, the LED system 1600 includes an LED string 105 and a power converter module 1610. The power converter module 1610 can include components described in FIGS. 6 through 15. For example, the power converter module 1610 can include voltage source 110, inductor 115, switch 640, current sensor 645 and controller 650 described with respect to FIG. 6. In another example, the power converter module 1610 can include voltage source 110, diode 120 and converter 830 described with respect to FIG. 8. In yet another example, the power converter module 1610 can include voltage source 110, diode 120 and converter 1030 described with respect to FIG. 10. In still yet another example, the power converter module 1610 can include voltage source 110, transformer 1220, switch 1225, Rs 1215, R2 1210, R1 1205 and controller 1230 described with respect to FIG. 12.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A converter, comprising:
a current sensor configured to derive a feedback signal corresponding to an average current through a light emitting diode string;
a switch coupled on a first end to the current sensor; and
a controller coupled on a first port to a second end of the switch and on a second port to the current sensor, wherein the controller is configured to modulate a peak current through the light emitting diodes and to vary a switching frequency of the light emitting diodes, and wherein the controller is configured to regulate the average current to reduce reactivity of the average current to a voltage across the light emitting diode string by at least one of:
modulating the peak current through the light emitting diode string; and
varying the switching frequency.

2. The converter as set forth in claim 1, wherein the current sensor comprises a voltage divider, the voltage divider coupled at one terminal to the light emitting diode string, at a second terminal to the second port of the controller and on a third terminal to a sense resistor.

3. The converter as set forth in claim 2, wherein the current sensor comprises a transformer coupled between the light emitting diode string and the voltage divider.

4. The converter as set forth in claim 1, wherein the feedback signal is at least one of a source voltage and the voltage across the light emitting diode string.

5. A converter, comprising:
a current sensor configured to derive a feedback signal corresponding to a peak current through a light emitting diode string;
a switch coupled on a first end to the current sensor; and
a controller coupled on a first port to a second end of the switch and on a second port to the current sensor, wherein the controller is configured to use the feedback signal corresponding to the peak current to regulate the average current to reduce reactivity of the average current to a voltage across the light emitting diode string, wherein the current sensor comprising:
a first resistor coupled on a first end to a cathode of a last light emitting diode in the light emitting diode string and on a second end to the second port of the controller, wherein an anode of a first light emitting diode in the light emitting diode string is coupled to ground; and
a second resistor coupled on a first end via a third resistor to the anode of the first light emitting diode.

6. The converter as set forth in claim 1, wherein the controller and the switch are included in a control module.

7. The converter as set forth in claim 1, wherein the current sensor comprises a voltage divider coupled to a reference port of the controller and a transformer coupled between the voltage divider and the light emitting diode string.

8. A light emitting diode system, comprising:
a light emitting diode string; and
a power converter, the power converter comprising:

a current sensor configured to derive a feedback signal corresponding to an average current through the light emitting diode string;

a switch coupled on a first end to the current sensor; and a controller coupled on a first port to a second end of the switch and on a second port to the current sensor, wherein the controller is configured to modulate a peak current through the light emitting diodes and to vary a switching frequency of the light emitting diodes, and wherein the controller is configured to regulate the average current based on the feedback signal to reduce reactivity of the average current to a voltage across the light emitting diode string by at least one of:

modulating the peak current through the light emitting diode string; and varying the switching frequency.

9. The light emitting diode system as set forth in claim 8, wherein the current sensor comprises a voltage divider, the voltage divider coupled at one terminal to the light emitting diode string, at a second terminal to the second port of the controller and on a third terminal to a sense resistor.

10. The light emitting diode system as set forth in claim 9, wherein the current sensor comprises a transformer coupled between the light emitting diode string and the voltage divider.

11. The light emitting diode system as set forth in claim 8, wherein the feedback signal is at least one of a source voltage and a voltage across the light emitting diode string.

12. A light emitting diode system, comprising:
a light emitting diode string; and
power converter, the power converter comprising:
  a current sensor configured to derive a feedback signal corresponding to a peak current through the light emitting diode string;
  a switch coupled on a first end to the current sensor; and
  a controller coupled on a first port to a second end of the switch and on a second port to the current sensor, wherein the controller is configured to use the feedback signal corresponding to the peak current to regulate the average current to reduce reactivity of the average current to a voltage across the light emitting diode string, wherein the current sensor comprising:
    a first resistor coupled on a first end to a cathode of a last light emitting diode in the light emitting diode string and on a second end to the second port of the controller, wherein an anode of a first light emitting diode in the light emitting diode string is coupled to ground; and
    a second resistor coupled on a first end via a third resistor to the anode of the first light emitting diode.

13. The light emitting diode system as set forth in claim 8, wherein the controller and the switch are included in a control module.

14. The light emitting diode system as set forth in claim 8, wherein the current sensor comprises a voltage divider coupled to a reference port of the controller and a transformer coupled between the voltage divider and the light emitting diode string.

15. For use in a light emitting diode system, a method of providing a constant current source, the method comprising:
sensing a current through a plurality of light emitting diodes;
deriving a feedback signal corresponding to the current;
regulating an average current based on the feedback signal to reduce reactivity of the average current to a voltage across the plurality of light emitting diodes, wherein regulating further comprises selecting and performing at least one of: modulating a peak current through the light emitting diode string; and varying a frequency.

16. The method as set forth in claim 15, wherein the sensing is performed by a current sensor, the current sensor comprising a voltage divider, the voltage divider coupled at one terminal to the light emitting diode string, at a second terminal to the second port of the controller and on a third terminal to a sense resistor.

17. The method as set forth in claim 16, wherein the current sensor further comprises a transformer coupled between the light emitting diode string and the voltage divider.

18. The method as set forth in claim 15, wherein the feedback signal is at least one of a source voltage and a voltage across the plurality of light emitting diodes.

19. For use in a light emitting diode system, a method of providing a constant current source, the method comprising:
sensing a peak current through a plurality of light emitting diodes;
deriving a feedback signal corresponding to the peak current;
regulating the average current based on the feedback signal to reduce reactivity of the average current to a voltage across the plurality of light emitting diodes, wherein regulating further comprises varying a duty cycle of a controller, wherein sensing is performed by a current sensor, the current sensor comprising:
  a first resistor coupled on a first end to a cathode of a last light emitting diode in the plurality light emitting diodes and on a second end to the second port of the controller, wherein an anode of a first light emitting diode in the plurality of light emitting diodes is coupled to ground; and
  a second resistor coupled on a first end via a third resistor to the anode of the first light emitting diode.

20. The method as set forth in claim 15, wherein the regulating the average current is performed by a control module, the control module comprising a controller and a switch.

* * * * *